J. B. & C. B. EBLING.
PLANTER AND FERTILIZER DISTRIBUTER.
APPLICATION FILED MAY 4, 1909.
953,822.
Patented Apr. 5, 1910.
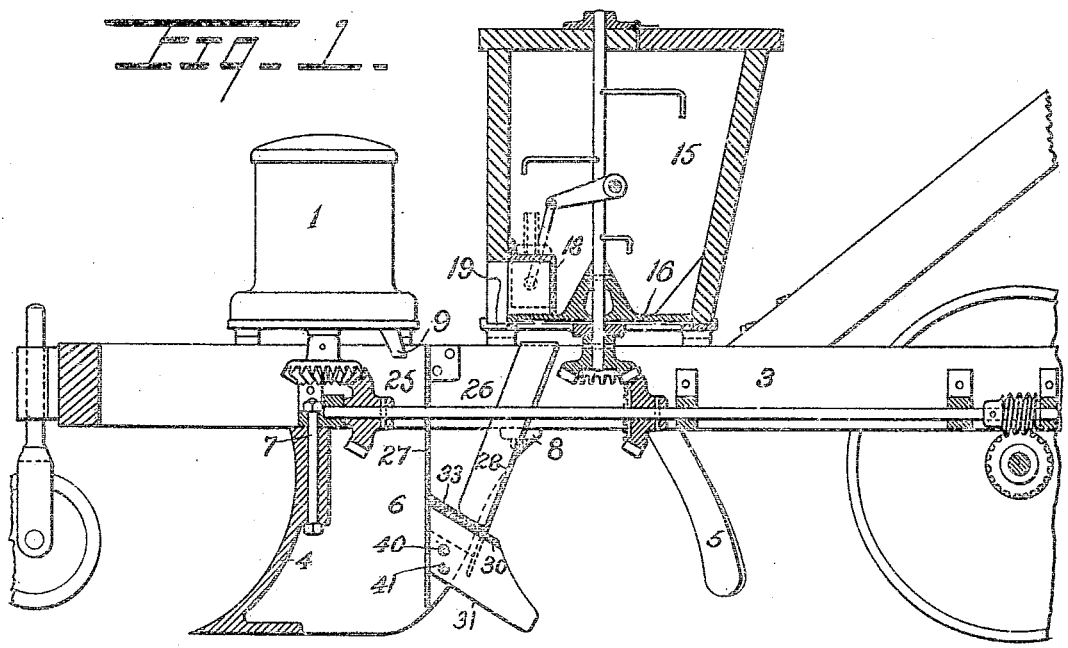
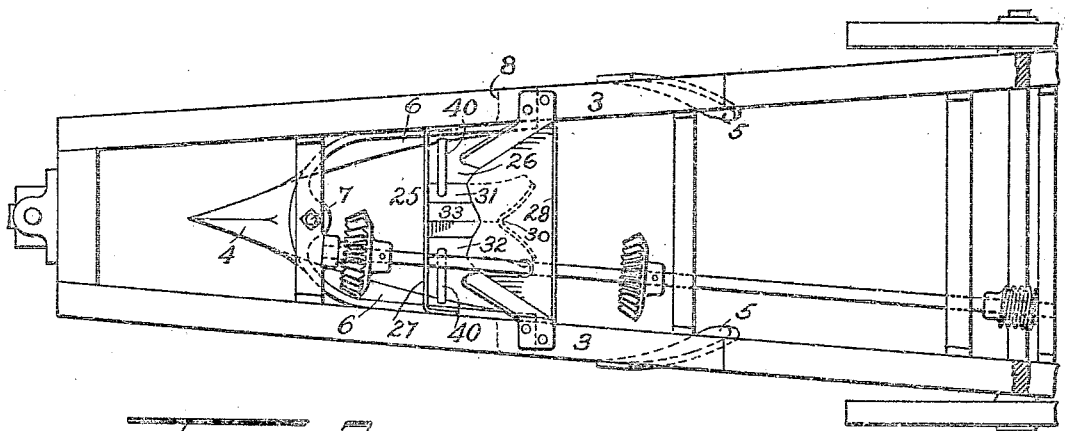
John B. Ebling
Charles B. Ebling
Inventors
Witnesses
By
Attorney

UNITED STATES PATENT OFFICE.

JOHN B. EBLING, OF TUCKERTON, AND CHARLES B. EBLING, OF DAUBERSVILLE, PENNSYLVANIA.

PLANTER AND FERTILIZER-DISTRIBUTER.

953,822.  Specification of Letters Patent.  Patented Apr. 5, 1910.

Application filed May 4, 1909. Serial No. 493,781.

*To all whom it may concern:*

Be it known that we, JOHN B. EBLING and CHARLES B. EBLING, both citizens of the United States, residing, respectively, at Tuckerton and Daubersville, in the county of Berks and State of Pennsylvania, have invented certain new and useful Improvements in Planters and Fertilizer-Distributers, of which the following is a specification.

Our invention relates particularly to corn planters or the like having combined therewith a fertilizer hopper and means for distributing the fertilizer simultaneously with the seed; and our main object is to provide an improved construction whereby the fertilizer will be conveniently delivered to the furrow out of line with the sown seed so as to avoid injury to the latter which is liable to occur when it is deposited in contact with the latter.

The invention is fully described in connection with the accompanying drawing and the novel features are specifically pointed out in the claim.

Figure 1 is a longitudinal sectional view of a portion of a combined planter and fertilizer distributer embodying our invention. Fig. 2 is a plan view of the same with the hoppers removed.

The general construction of the planter indicated is well known and only the main features thereof in connection with which our invention is utilized need be referred to.

The seed hopper 1 is mounted upon the spread side beams 3, 3 of the frame, and the forwardly located share 4 and rearwardly located furrow-closing devices 5 are fixed beneath said beams: said share having rearwardly extending side portions 6 and being suitably secured to the beams 3, 3 at 7 and 8 as indicated. The seed hopper 1 is provided with any suitable feed mechanism as usual whereby the seed is delivered therefrom at outlet 9, rearward of the share face.

The fertilizer hopper 15 is mounted upon the machine frame behind the seed hopper 1, and as shown is like that set forth in Letters Patent No. 795,031, issued to us on July 18th, 1905; the fertilizer being delivered by the rotary bottom plate 16 thereof, through the gated box 18 overhanging said plate, to the lateral discharge outlet 19 from the hopper, located rearward of the seed outlet 9. In our improved construction we form separate passageways 25 and 26 for the seed and fertilizer respectively, leading downward from said hopper outlets 9 and 19 by providing partition plates or walls 27 and 28 extending transversely of the machine between the frame beams 3, 3 and depending below the latter; the seed being delivered through said passage way 25 forward of said partition plate 27, and the fertilizer through the passage way 26 between said plates 27 and 28. To provide for so controlling the delivery of the fertilizer to the furrow formed by the share 4 as to properly separate it from the seed delivered from the hopper 1, we employ a laterally inclined delivery device 30 at the bottom of the fertilizer passage-way 26: said device consisting as shown of a metal plate bent to a V-shaped cross-section, taken transversely of the machine, and forming oppositely inclined surfaces 31, 32 sloping toward the respective sides of said furrow, so that the fertilizer delivered from the outlet 19 of the hopper 15 will be divided by said device and delivered on each side of the centrally delivered seed from hopper 1. This V-shaped divider plate extends transversely of the machine between the rearwardly extending side portions 6 of the share, to which portions it is rigidly secured by bolts 40, 41. The partition plates 27 and 28, forming the front and rear walls of the fertilizer passage-ways 26 above said laterally inclined bottom device are preferably independently connected by a V-shaped bottom plate 33 above the latter though such bracing connection may be dispensed with and the partition plates be attached to the device 30 if desired.

What we claim is:—

In combination with the spread framebeams having seed and fertilizer hoppers thereon provided with separate outlets arranged in tandem, a share having rearwardly extending side portions secured to said beams, spaced partition plates between said beams and depending below the same rearward of the respective hopper outlets to form a fertilizer delivery way between them, and a rearwardly inclined V-shaped
5 bottom device connecting said plates and serving to divide and laterally discharge the fertilizer substantially as set forth.

In testimony whereof, we affix our signatures, in the presence of two witnesses.

JOHN B. EBLING.
CHARLES B. EBLING.

Witnesses:
D. M. STEWART,
W. G. STEWART.